Figure 1:
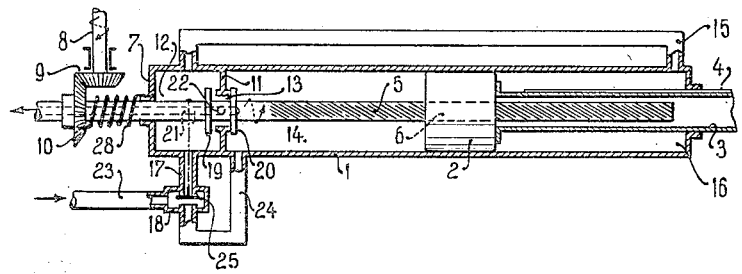

Feb. 7, 1950 L. H. BAGHUIS 2,496,369
FOLLOW-UP AND PRESSURE FLUID TYPE SERVOMOTOR
Filed Oct. 29, 1945 2 Sheets-Sheet 1

Inventor
L. H. Baghuis
By Glascock Downing Seibold
Attys.

Feb. 7, 1950     L. H. BAGHUIS     2,496,369
FOLLOW-UP AND PRESSURE FLUID TYPE SERVOMOTOR
Filed Oct. 29, 1945     2 Sheets-Sheet 2
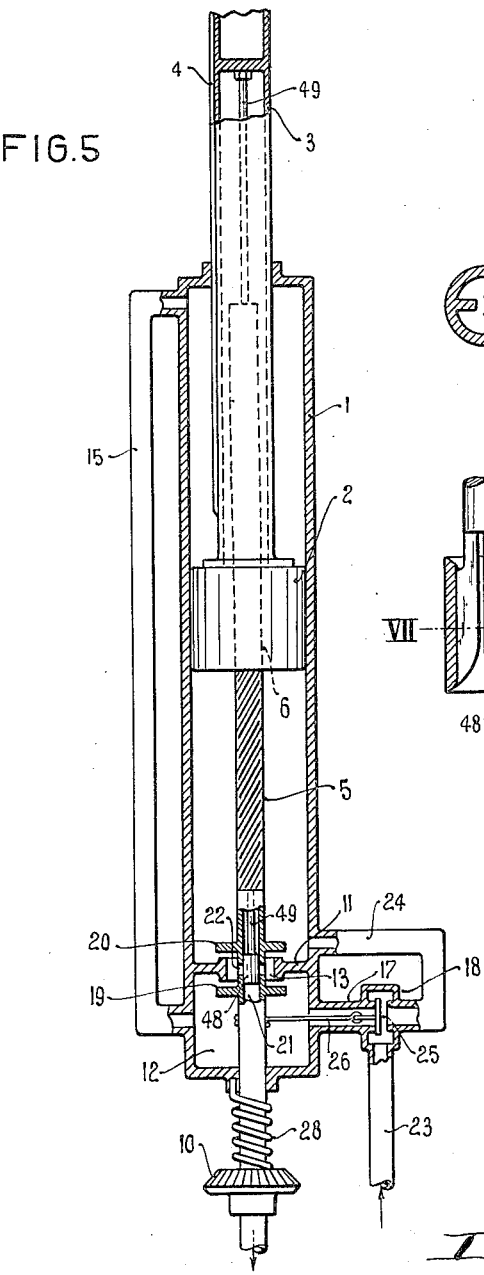
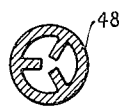
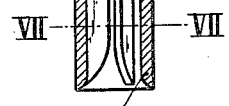
Inventor
L. H. Baghuis Patented Feb. 7, 1950

2,496,369

UNITED STATES PATENT OFFICE 2,496,369

FOLLOW-UP AND PRESSURE FLUID TYPE SERVOMOTOR

Ludovicus Hendrikus Baghuis, Utrecht, Netherlands

Application October 29, 1945, Serial No. 625,128
In the Netherlands March 27, 1942

Section 1, Public Law 690, August 8, 1946
Patent expires March 27, 1962

3 Claims. (Cl. 121—41)

The invention relates to mechanism for transforming rotary motion into rectilinear motion with the air of a hydraulic or a pneumatic motor, and particularly to auxiliary steering mechanism for motor vehicles comprising on the one hand a pair of elements consisting of a cylinder and a piston, and on the other hand a pair of elements consisting of a screw spindle and a nut, one element of the first mentioned pair (preferably the cylinder) being stationary and the other (preferably the piston) being adapted for rectilinear movement, locked against rotation and coupled with one element (preferably the nut) of the latter pair, the other element of which (preferably the screw spindle) being adapted for rotation, whereas, with a view to the actuation of lift valves for the supply of pressure fluid to or the discharge thereof from the cylinder spaces situated on both sides of the piston, the rotatable element (the screw spindle) is adapted to freely rotate through a certain angle before the rectilinearly movable element (the piston) is actuated.

In known devices of this kind, the valves are mounted within the piston and actuated as a consequence of the relative movement of the nut and the piston. To that end, these elements are interconnected with a certain amount of play. These devices must be provided with long pistons and cylinders.

In other known mechanism for the same purpose, the valves are mounted outside the cylinder and the piston and connected to the latter by means of an independent screw spindle and nut. In consequence thereof, the lengths of the cylinder and the piston may be small.

The present invention differs from the known devices in this, that one element (preferably the nut) of the pair consisting of screw spindle and nut is integral with or attached without play to the rectilinearly movable element (for instance the piston), and that the rotatable element (for instance the screw spindle is adapted to move axially, the stroke thereof being confined between abutments. Mechanism in accordance with the invention has the advantage that it comprises only one single screw spindle and nut, that the lift valves may be mounted outside the piston and the cylinder, and that the piston and the cylinder may have small dimensions in axial direction. Furthermore, it is very compact and cannot easily be damaged.

According to the invention, all valves for the distribution of the pressure fluid may be mounted on the rotatable element (preferably the screw spindle) and be closed and opened by the axial movement of said element. It is also possible for only a part of the number of valves being mounted on the rotatable element and actuated by the axial movement thereof, and for the other valves being connected to said element by a friction coupling and operated as a consequence of the rotation of that element.

Figure 2:
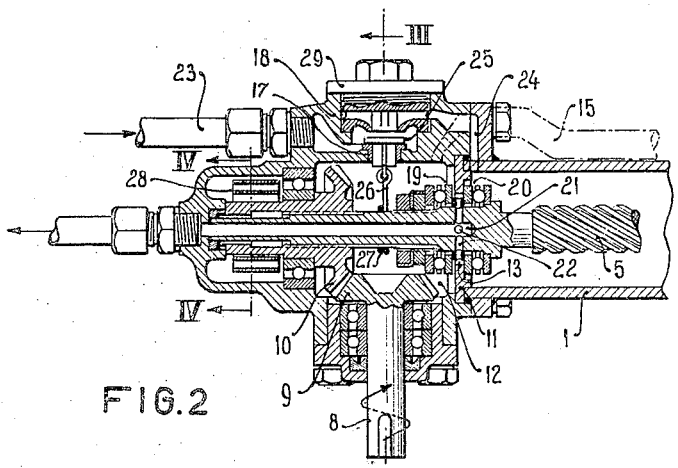
Figures 3, 4:
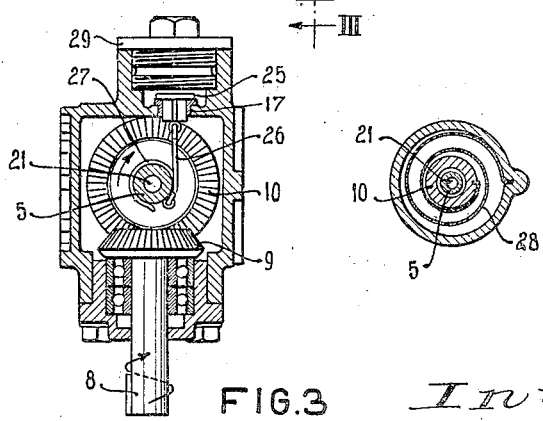

Referring to the drawings, which, by way of example only, show several embodiments of the invention:

Fig. 1 is a diagrammatic longitudinal sectional view of a hydraulic steering mechanism for a motor vehicle, Fig. 2 is a detailed sectional view on an enlarged scale of a portion of the mechanism according to Fig. 1, Fig. 3 is a cross section of the line III—III of Fig. 2, Fig. 4 is a cross section of the line IV—IV of Fig. 2, Fig. 5 is a longitudinal sectional view of a second embodiment of the invention, Fig. 6 shows a detail of the mechanism according to Fig. 5 on an enlarged scale, and Fig. 7 is a cross section on the line VII—VII, of Fig. 6.

In Figs. 1–4, 1 designates a cylinder and 2 is a piston of a servomotor. The piston 2 is rigidly attached to a piston rod 3, which at its free end (not shown) is adapted to be connected to the system to be steered, e. g., to the steerable wheels of a motor vehicle. The piston rod is provided with a key preventing rotation of the piston 2. Mounted in the center line of the piston rod 3 is a screw spindle 5, cooperating with a corresponding threaded bore 6 of the piston 2. The screw spindle 5 is supported for rotation and for axial displacement by the cylinder cover 7 and adapted to be rotated by means of a rod 8, for instance the steering rod of a motor vehicle. The steering rod 8 and the screw spindle 5 are interconnected by bevel gear wheels 9 and 10, the wheel 10 being mounted for sliding movement on the plain portion of the screw spindle. A partition 11 separates a chamber 12 in the cylinderhead from the other cylinder spaces, said chamber communicating with the cylinder spaces 14 and 16 and with a valve box 18 through an aperture 13 in said partition 11, through a conduit 15 and through a conduit 17, respectively. The aperture 13 can be closed by means of lift valves 19 and 20 mounted on the screw spindle 5. Said spindle has an axial bore 21 opening through a cross bore 22 into the space between the valves 19 and 20 and serving as a discharge passage for the pressure fluid, e. g. oil. The supply of pressure fluid from a pump (not shown) is effected through a conduit 23 connected to the valve box 18. Moreover, said box communicates with the cylinderspace 14 through a conduit 24. Mounted within the valve box 18 is a double acting valve 25 of the lift type controlling the passage of pressure fluid from the supply conduit 23 to one or the other of the conduits 17 or 24. The valve is moved from one position to the other depending upon the direction in which the screw spindle is rotated by a spring 27 coiled in frictional contact with the screw spindle and having the end 26 extended and connected with the stem of the valve 25 coupled with the screw spindle by means of a friction coupling 26, 27 (Fig. 3) and actuated when said spindle is rotated. Encircling the spindle 5 is a spring 28 counteracting rotation of the screw spindle from the position shown in Fig. 1, in which position the piston is about in the middle of the cylinder, said spring being strong enough to return the screw spindle to its neutral position after the steering wheel has been released. If the hydraulic device operates properly, a force just sufficient to overcome the friction of the screw spindle and of the steering rod will do for returning said spindle to its neutral position.

The apparatus operates as follows:

If the steering rod 8 is rotated in clockwise direction, the screw spindle 5 rotates in counter-clockwise direction and will move toward the left, since it is screwed out of the piston 2 held by the load to be displaced. Owing to this rotation of the screw spindle 5, valve 25 is moved into the position shown in Figs. 1–3 by the pull exerted thereon by the spring of the friction coupling 26, 27 thus closing conduit 17. Due to the axial displacement of the screw spindle 5, the aperture 13 in partition 11 is closed by valve 20. In this position of the valves 20 and 25, pressure fluid which continuously flows through the hydraulic system during the steering operation, is supplied to the cylinder space 14 through conduit 23, valve box 18 and conduit 24, and fluid can be discharged from the cylinder space 16 through conduit 15, chamber 12, cross bore 22 and axial bore or passage 21 to the suction side of the fluid pressure pump (not shown). The piston is thereby moved to the right and the load is displaced. When the steering wheel is not turned further, the piston and the screw spindle are moved in unison to the right by the pressure of the fluid, and owing to the valve 20 being opened the cylinder space 14 is put in communication with the discharge conduit 22, 21 so as to relieve the piston of pressure. If, however, rotation of the screw spindle in the chosen direction is continued, the valves remain in the position shown and the displacement of the piston due to the pressure of the fluid continues corresponding to the rotation and the pitch of the screw spindle. It will be apparent that each position of the screw spindle or of the steering rod corresponds to a definite position of the piston.

If the described device is used as a steering mechanism for a motor vehicle, it is desirable that, after the steering wheel has been released, the wheels of the vehicle automatically return to their neutral position. This, however, is not possible without the aid of special means, since travel of the piston is only possible during rotation of the screw spindle. To this end, a spring 28 is provided for counteracting the rotation of the screw spindle from its neutral position.

As soon as the steering wheel has been released, said spring returns the screw spindle to its neutral position. During the return movement, valve 25 is moved to its other position in which the supply conduit 23, instead of being connected to conduit 24, is connected to conduit 17. This movement of the valve 25 is caused by the slackening of the coils of the spring 27 and the resulting thrust imparted to the end 26 and the valve 25. Simultaneously, valve 19 is closed and valve 20 opened. The cylinder space 16 is thereby filled with pressure fluid, and fluid can be discharged from the cylinder space 14. The piston is thus returned to its center position. If the screw spindle is rotated in the opposite direction, conditions will be reversed.

It is apparent that there is a certain amount of play between the movement of the screw spindle (the steering rod) and that of the piston (the front wheels of the vehicle). This play is necessary for the operation of the valves and need not be larger than that existing in ordinary mechanical steering devices, so that it will not affect the steering operation.

If the hydraulic or pneumatic part of the mechanism does not operate properly, for instance, if no fluid pressure is available, the piston and the parts connected thereto can be operated manually. During rotation of the screw spindle, the total force required for the steering operation must then be exerted on the piston by the thread of the screw spindle. Since in this case said force is not furnished by the pressure fluid, the steering operation requires much more energy than when the hydraulic or pneumatic system is in operation. In order to take up the reaction forces exerted on the screw spindle, valves 19 and 20 are constituted as thrust bearings (Fig. 2). When the described hydraulic device is in operation, the force required for steering has only to be sufficient to overcome the friction of the screw spindle, that of the steering rod and the force of the spring 28, so that steering is extraordinarily light.

In Fig. 2, the valve seat connected to conduit 24 is formed on a screw plug 29 screwed in the valve box. The lift of valve 25 can be adjusted by means of the screw plug 29.

It is observed that the described devices are not confined to their use in steering mechanisms for motor vehicles. Many other forms of details are possible within the scope of the invention. For instance, the screw spindle and the nut, or the piston and the cylinder, may be interchanged.

In the straight position of the steerable front wheels of the vehicle, the piston 2 is practically unloaded in the middle of the cylinder 1 and neither valve 19, nor valve 20 is closed, causing a continuous flow of fluid from the pressure conduit 23 into the suction conduit 21 and bringing about a loss of energy. In order to avoid these losses in the mechanism according to Fig. 5, the bores 22 are closed by a slide valve 48 mounted within the axial bore 21 when the piston 2 is in its neutral or center position. This slide valve is connected to the piston rod 3 and thus to the piston 2 by means of a rod 49. Assuming the steering wheel or the screw spindle 5 to be rotated, said spindle is axially moved with respect to the piston, the discharge bores 22 are opened, one of the valves 19, 20 is closed and pressure fluid is admitted on one side of the piston. The slide valve 48 is hollow (Figs. 6 and 7), so that, after downward displacement thereof (Fig. 5) and after opening of the bores 22, the fluid can flow into the discharge conduit 21 through the slide valve.

What I claim is:

1. An apparatus for transforming rotary motion into rectilinear motion with the aid of hydraulic or pneumatic means, in particular an auxiliary steering mechanism for motor vehicles comprising in combination a cylinder and a piston forming one pair of cooperating elements, one element of which being stationary and the other being locked against rotation and adapted for rectilinear displacement, a screw spindle and a nut forming a second pair of cooperating elements, one element of which being attached without play to the rectilinearly displaceable element of the first mentioned pair of elements and the other being adapted for rotation and restricted axial movement and capable of rotating freely through a certain angle before actuating the rectilinearly displaceable element, cylinder spaces situated on both sides of the piston, and poppet valves for the supply of pressure fluid to and discharge thereof from said cylinder spaces, and consisting of movable valve discs and stationary seats, said valves being adjusted by and during the free rotation of said rotatable element and the valve discs of at least part of the number of valves being mounted on said rotatable element and adapted to be closed and opened by the slight axial displacement of said rotatable element, said mounted valve discs and cooperating with their respective stationary seats and constituting abutments to confine axial displacement of said rotatable element.

2. An apparatus as claimed in claim 1, in which part of the number of valve discs are mounted on said rotatable element and the remaining valves are adapted to be closed and opened as a consequence of the rotation of said element.

3. An apparatus as claimed in claim 1, comprising a slide valve connected to the rectilinearly displaceable element and adapted to close the pressure fluid discharge conduit when said element is in its center position.

LUDOVICUS HENDRIKUS BAGHUIS.

REFERENCES CITED

The following references are of record in the file of this patent:

UNITED STATES PATENTS

| Number | Name | Date |
| --- | --- | --- |
| 1,500,685 | Roberts | July 8, 1924 |
| 1,651,838 | Roberts | Dec. 6, 1927 |
| 2,213,271 | Davis | Sept. 3, 1940 |
| 2,237,400 | Washburn | Apr. 8, 1941 |